United States Patent Office 3,816,389
Patented June 11, 1974

3,816,389
PROCESS FOR TREATMENT OF OIL-CONTAINING SEEDS
Shigetoshi Mihara, Yanosuke Inaba, Tokyo, and Koichi Tachibana, Omiya, Tomio Endo, Ageo, Japan, assignors to Nakataki Pharm. Industry Co., Inc., Tokyo, Japan
No Drawing. Continuation-in-part of application Ser. No. 888,856, Dec. 29, 1969, now abandoned. This application Feb. 22, 1972, Ser. No. 228,333
Claims priority, application Japan, Dec. 30, 1968, 44/530
Int. Cl. A23j 1/12, 1/14; C11b 1/10
U.S. Cl. 260—123.5
3 Claims

ABSTRACT OF THE DISCLOSURE

Oilseed material such as oilseeds or oil-containing bran containing a substantial amount of undenatured protein and in excess of 6% by weight of water is subjected to grinding under wet milling conditions in the presence of from about 1.5 to 4, preferably about 2 to about 3, times its weight of methanol, ethanol, acetone or mixtures thereof, containing no more than 2% by weight of water, to remove from the material water, carbohydrates, pigment material, wax material, odor and taste principles, and free fatty acids, and to precondition the material by opening the cell structure; separating the solid material from this first liquid extract and further extracting the solid material with a fat solvent, separating the oil-bearing extract and further separating the twice extracted solid material into a fine particle fraction high in undenatured protein and a coarse particle fraction high in fiber.

CROSS REFERENCE TO RELATED CASE

This is a continuation-in-part of our copending application Ser. No. 888,856, filed Dec. 29, 1969, now abandoned.

BACKGROUND OF THE INVENTION

This invention relates to an improved process for separately recovering oil and a protein-rich powder from seeds or brans.

DESCRIPTION OF THE PRIOR ART

In the conventional treatment of oil-bearing seeds, the seeds are hulled, crushed, rolled, and flaked under high pressure and are subjected to other treatments prior to extracting the oils with fat solvents. The treatments conventionally include a drying step to reduce the moisture content to approximately 5% by weight. Examples of such seeds and seed materials are perilla ocimoides, flax, hemp, paulownia, sunflower, soybeans, cotton, sesame, rape, castor, kapok, olive, camellia, peanut, the embryo bud of Indian corn (corn germ) and rice bran.

The oil produced from these prior conventional methods requires subsequent refining steps to remove carbohydrates, color material, waxes, free fatty acids and various odor and taste principles; and the steps of refining are technologically complex and the processes inevitably result in loss of valuable oil. In addition, the non-oil residue of the oil seed material, though containing substantial amounts of protein, is difficult to process so as to recover good quality undenatured protein. Oftentimes the pretreatments prior to oil extraction have involved heating steps that, in themselves, cause denaturing of the protein.

The water that exists in seasoned stabilized oil seeds is found to a large extent within the cell and the amount does not vary substantially under ordinary methods of storage, transpartation or preservation. It is generally accepted that effective oil extraction from such seeds with the conventionally used fat solvents requires that the seeds have a total water content of 5% by weight, or less. Owing to the fact that this moisture is distributed within the refractory cell structure, conventional drying, as by ovens or grain driers, subjects the oilseed material to excessive temperatures detrimental to the quality of both the oil and the protein.

In some pretreatments of such oil-bearing materials prior to solvent extraction, the comminuting effect of the mechanical grinding is said to be intensified by adding water and organic solvent to a wet grinding step or by immersing the seed material in water prior to wet grinding. Water, used in this way, increases the viscosity of the ground material, and it is not effectively oil extractable unless large excesses of fat solvents are used, up to several times the quantity used, say in the practice of this invention. This use of water also has the disadvantage of causing expansion or swelling of the fiber, carbohydrate and protein constituents of the seed material, and partial dissolving of the carbohydrate. This not only increases the viscosity of the mixture but also renders difficult the separation of the solids from the extract, and tends to cause colloidal suspension of oil and protein with the consequential difficulties of separation and recovery.

The solids separated from these prior processes using water naturally contain large proportions of water, and the conventional drying requires prolonged times at high temperateures, which is detrimental to the quality of both the oil and the protein, constituents, and moreover renders decoloring and refining unduly complex.

It is known to subject such material as safflower seed material to a wet milling step using an oil solvent to achieve differential size reduction in the solvent of the kernel material containing high protein and the hull material containing high fiber content. See U.S. Pat. 3,542,559. The solvent bearing the extracted safflower oil is separated, and the residue material can then be screened to separate it into a protein-rich fine fraction and a high-fiber coarser fraction. This prior art process, however does not provide for removal or adjustment of water content, and the residue after oil extraction contains all the oil-insoluble impurities originally present in the raw material.

BRIEF DESCRIPTION OF THE INVENTION

This invention relates to a process for separately recovering oil and a protein-rich powder from oil bearing material comprising mixing one part by weight of an oil bearing material of the group consisting of oil seeds and oil-containing bran, said oil bearing material also containing a substantial amount of undenatured protein and in excess of 6% by weight of water, with a first solvent consisting of about 1.5 to four parts by weight of a water-miscible solvent selected from the group consisting of methanol, ethanol and acetone and mixtures thereof, said first solvent containing no more than 2% by weight of water; grinding the mixture under wet milling conditions; separating the milled mixture into a first liquid phase and a first solid phase; mixing said first solid phase with an oil-extracting organic solvent until the oil in said first solid phase dissolves in said oil-extracting solvent to obtain a second liquid phase enriched with oil and a second solid phase; separating the second liquid phase from the second solid phase and recovering oil from said second liquid phase; drying the second solid phase to obtain a finely divided powder; and passing the powder through a sieve of a size in the range of 60–100 mesh to separate the powder into a protein-rich fraction which passes through the sieve and a fraction of composed primarily of indigestible substance which remains on the sieve.

The term "grinding under wet milling conditions" as used in this specification and claims refers to those milling processes as are used conventionally in the wet milling of grain, using a dispersion mill, a homogenizer or the like. It refers to the comminution or levigation action simultaneously with emulsification or intimate mixing with the liquid substrate in which the comminution is being carried out, that characterizes this kind of milling.

The object of the present process is to separate, in a short time, (1) oil of good quality, (2) nutritious components (vitamins, starch, etc.) containing protein of good quality and which have subjected to minimum denaturing action, and (3) fibers, directly from seeds and the like containing fats and oils.

The present process is applied to the raw materials used for extraction of ordinary fats and oils, but particularly suitable to the oil bearing materials previously mentioned, i.e. seeds of perilla ocimoides, flax, hemp, paulownia, sunflower, soybean, cotton seed, sesame, rapeseed, castor-oil plant seed, kapok, olive, camellia seed, peanut, and the embryo bud of Indian corn (corn germ), and rice bran. These seeds are treated in their raw, "as harvested" condition, that is, they have not been subjected to any hulling, water dipping, crushing or flaking, although they may have been subjected to surface cleaning and drying. In the case of corn germ and rice bran, they are treated as received from the corn germ or rice bran separating equipment. These seed contain 6–15% by weight of water (usually about 10%).

The present process does not use excessive temperatures and permits adjustment of the water content to that which is most suitable for oil extraction.

In the present process, the raw material is first ground under wet milling conditions in an organic solvent (methanol, ethanol, acetone, or mixtures thereof) containing no more than 2% water in which neutral oil is relatively insoluble, but which mixes freely with water. The quantity of solvent used in the first step is sufficient if it is 1.5 to 4, preferably about 2 to 3, times by weight the quantity of raw material treated. The affinity of these organic solvents for water is so great that they act on the water present in the cells of the raw material through the cell-wall to effect a kind of dehydration. The water contained in the cell is extracted by this action through the cell-wall, so that the cell-wall itself is weakened and becomes relatively easily ruptured. At this time if the wet grinding operation is simultaneously applied to the mixture, the substances of the mixture are readily separated into fibrous part, hull part, and ruptured cell-wall part, and the water content can be adjusted to an optimum condition for subsequent removal of fat.

The present process is based in part on this above discovery of the unexpectedly advantageous preconditioning result of this first stage of treatment.

As organic solvents which can fully develop the advantages of the present process, methanol, ethanol, acetone and mixtures thereof are especially suitable. The quantity of solvent is preferably 2 to 3 times (by weight) the quantity of raw material. This quantity is satisfactory to fully realize the above advantages, to facilitate the reclamation of the solvent, to increase the wet grinding efficiency, and to minimize the loss of neutral oil. The solvent is used without addition of water and its content of water should be 2% by weight or less. The use of substantially anhydrous methanol, ethanol or acetone is most preferable. The raw material should not be previously immersed in water nor crushed. The grinding machine is of the wet milling type. This grinding is not mere crushing, and a hammer mill or a jet crusher is not suitable for their use. Proper devices are a dispersion mill, an agitation mixer, or a homogenizer. These devices perform a grinding or triturating action simultaneously with an emulsifying action. Any grinding machine of the wet milling type which can grind the fibrous portion of the raw material to a moderate size of minimum 30 to 40 mesh can be used. This grinding effects a penetrating action and a cell-wall rupturing action on the raw material. The mixture acquires the proper viscosity for this action by mixing the moisture of the raw material with the dissolved components. The fibrous portion is left in moderate (relatively coarse, minimum 30 to 40 mesh in size) size easy to separate. This grinding action period should be from 5 to 20 minutes and a longer or shorter grinding operation is not necessary. The completion of the grinding operation can readily be determined by observation of the solids, which will be in the above-noted state.

In contrast to this wet grinding action, when the fiber is treated for only a short time with heavy grinding as by a hammer mill, it is ground into a minute size, and extraction by the first solvent is not carried out completely, making it difficult to accomplish the object of separation of undenatured protein of good quality.

After completing the said novel treatment, the solid matter is separated from the solution by a conventional process (e.g. filter, centrifuge, etc.). With the separated extract solution there are simultaneously removed coloring substances that would be likely to be absorbed subsequently on the protein, and bitter principles, in addition to substances normally removed when purifying oil, thus improving the quality of the protein.

The thus obtained solid matter can be freed from the solvent at temperatures lower than that of denaturation of the protein because it is powdery, and the water content is about 5%.

Afterwards, the solid matter is treated with an ordinary fat removing solvent such as 3 to 5 times (by weight) of hexane, isopropyl alcohol, benzene, toluene, etc., and there are obtained after removing the solvent oil of good quality and solid powder. When this dried powder is classified with a 60- to 100-mesh sieve, it is easily separated into a fibrous portion and a sweet tasting and nutritious white fine powder containing protein. This fine powder is characteristically smaller than 150 mesh in size and the fibrous part is mostly larger than 40 mesh, and the fibrous portion and hull are thus ordinarily completely separated with 60- to 100- mesh sieves.

The present process not only separates oil, nutritious component, and fibrous portion, but also the oil and nutritious components are better in quality than the conventional product, and it is further characterized in that it is carried out easily in industrial production and in a short time.

EXAMPLE 1

Samples comprising one hundred grams of soybeans (water content 11.06%, oil 15.25%) were mixed with 300 grams of methanol containing 0, 10, 20, 30, and 40% of water, respectively, ground with a mixer for 10 minutes, and then filtered with ordinary filter paper (suction filtration) to obtain filtrate A; the residue was dried at 70° C. for 1 hour to obtain intermediate product (B); the dried residue was freed from fat with 300 grams of n-hexane, and neutral oil (S) was produced after distillation of hexane; and the separated solid matter (D) was classified with a 60-mesh sieve into fibrous part (E) and powder (F) after drying.

In the above examples the first solvent can be methanol, ethanol, acetone, or mixtures thereof containing up to 2% water.

| Amount of water in methanol (percent) | Time of (A) filtration to obtain filtrate A, sec. | Residual water content of intermediate product | Portion of soybeans in methanol (g.) | Quantity of neutral oil (C) (g.) | Residual oil in solid (D) (percent) | Quantity of— Fibrous fraction (E) (g.) | Powder (F) (g.) |
|---|---|---|---|---|---|---|---|
| 0 | 42 | 4.8 | 5.6 | 14.8 | 0.4 | 14.0 | 64.2 |
| 10 | 90 | 9.2 | 8.9 | 14.3 | 1.0 | 14.5 | 63.2 |
| 20 | 180 | 16.4 | 12.5 | 12.0 | 1.3 | 14.6 | 62.1 |
| 30 | 640 | 22.3 | 13.7 | 9.8 | 1.8 | 14.6 | 62.0 |
| 40 | 2,700 | 34.5 | 15.3 | 8.2 | 2.8 | 14.6 | 62.0 |

EXAMPLE 2

In procedure A of this example, one hundred grams of rice bran (water content 12%, oil content 20%) was mixed with 200 grams of anhydrous methonol and ground with a mixer for 12 minutes and filtered; then the solid matter was dried at 70° C. for 1 hour, freed from oil with hexane and thereafter classified with an 80-mesh sieve. For comparison, in procedure B one hundred grams of said rice, which had been dried to a water content of 5% and an oil content of 21%, was ground in 400 grams of hexane for 12 minutes and, after filtration, the solid matter was classified subsequently to the drying.

| | Part soluble in methanol (g.) | Oil extracted with hexane (g.) | Acid value of oil | Powder (g.) | Fibrous part (g.) |
|---|---|---|---|---|---|
| A | 10 | 16.2 | 3.2 | 65 | 14.2 |
| B | | 18.6 | 39.4 | 65 | 18.5 |

As will be clear from the above examples, the present process is advantageous from the viewpoint of the production process. As for the separated product, it has been demonstrated that, when oil is extracted with an oil solvent from the raw material containing more than 10% of water content, a dark-brown substance exists in the extracted oil and it is difficult to decolor the oil by purification. According to the present invention, since the water content is less than 6% when oil is extracted, no such difficulty arises. The advantage of this process lies in that colored substances, free fatty acids, odorous substances, and wax usually removed in the purification process are mostly removed in the previous treatment with the organic solvent. Further, the cell-wall is broken into powder so that fats and oils may be completely extracted with a fractional part (⅕ to ⅒) of the quantity of solvent usually required for oil removal. Furthermore, the extracted oil is mostly of such high quality that a further purification is not necessary. When the extracted oil is to be used as salad oil, the extracted oil can be prepared as a final product by a much more simple refining method. The solid matter which is freed from the oil is powdery so that it can be freed of solvent at temperatures far lower than in the conventional method, thus hardly causing any thermal denaturation of the contained protein. The thus obtained dried powder is separated into fibrous part and nutritious part containing protein.

The embodiments of the invention in which an exclusive property or privilege is claimed are defined as follows:

1. A process for separately recovering neutral oil and a protein-rich powder from oil-bearing material selected from the group consisting of raw seeds, corn germ and rice bran, said oil-bearing material containing undenatured protein, more than 6 weight percent water, fibrous material, and impurities comprising carbohydrates, color material, wax material, free fatty acids, and odor and taste principles, which comprises mixing one part by weight of said oil-bearing material with a first solvent consisting of about 1.5 to 4 parts by weight of a water-miscible solvent selected from the group consisting of methanol, ethanol and acetone and mixtures thereof, said first solvent containing no more than 2% by weight of water, and grinding the mixture under wet milling conditions to extract water and said impurities into said solvent to form a first liquid extract phase and the remainder of the mixture forming a first solid phase containing undenatured protein, neutral oil, fibrous material and less than 6 weight percent water; separating said first liquid extract phase from said first solid phase; mixing said first solid phase with an oil extracting organic solvent until the neutral oil in said first solid phase dissolves in said oil-extracting solvent to obtain a second liquid phase enriched with neutral oil and a second solid phase; separating the second liquid phase from the second solid phase and recovering neutral oil from said second liquid phase; drying the second solid phase to obtain a finely divided powder; and passing the powder through a sieve of a size in the range of 60–100 mesh to separate the powder into a protein-rich fraction which passes through the sieve and a fraction composed primarily of fibrous material which remains on the sieve.

2. The method of claim 1 in which the oil bearing material is soybeans.

3. The method of claim 1 in which the oil bearing material is rice bran.

References Cited

UNITED STATES PATENTS

| 2,879,167 | 3/1959 | Grandel | 99—80 G |
| 3,295,985 | 1/1967 | Cavanagh | 99—17 |
| 3,542,559 | 1/1970 | Goodban et al. | 99—17 X |
| 3,615,655 | 10/1971 | Freeman et al. | 99—17 |

A. LOUIS MONACELL, Primary Examiner

J. R. HOFFMAN, Assistant Examiner

U.S. Cl. X.R.

260—112 R, 412.4; 426—481